United States Patent
Kaneda

(10) Patent No.: US 10,019,661 B2
(45) Date of Patent: Jul. 10, 2018

(54) PRINT CONTROL APPARATUS, AND PRINT CONTROL METHOD FOR SELECTIVELY RASTERIZING PRINT DATA

(71) Applicant: CANON KABUSHIKI KAISHA, Tokyo (JP)

(72) Inventor: Takeshi Kaneda, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/177,200

(22) Filed: Jun. 8, 2016

(65) Prior Publication Data

US 2016/0379097 A1    Dec. 29, 2016

(30) Foreign Application Priority Data

Jun. 26, 2015 (JP) .................................. 2015-129202

(51) Int. Cl.
  *G06F 15/00* (2006.01)
  *G06K 1/00* (2006.01)
  (Continued)

(52) U.S. Cl.
  CPC ......... *G06K 15/1806* (2013.01); *G06F 3/124* (2013.01); *G06F 3/1215* (2013.01);
  (Continued)

(58) Field of Classification Search
  CPC ........... H04N 1/00344; H04N 1/00244; H04N 1/00307; H04N 1/00411;
  (Continued)

(56) References Cited

U.S. PATENT DOCUMENTS 5,555,099 A * 9/1996 Telle .................. H04N 1/00962
                                                                358/401
9,164,709 B2    10/2015 Kaneda
(Continued)

FOREIGN PATENT DOCUMENTS

JP    2011-110900 A    6/2011

OTHER PUBLICATIONS

European Search Report dated Nov. 11, 2016 issued in corresponding European Patent Application No. 16174103.8.
(Continued)

*Primary Examiner* — Douglas Tran
(74) *Attorney, Agent, or Firm* — Fitzpatrick, Cella, Harper & Scinto

(57) ABSTRACT

A print control apparatus includes a print controller including one or more processors and at least one memory. The print controller functions as a receiving unit to receive, from an external device, a print job that includes a plurality of ordered document files, a print page range indicating sequential target pages, an initial page in the sequential target pages corresponding to a print start page in one of the plurality of ordered document files, and a last page in the sequential target pages corresponding to a print end page in another one of the plurality of ordered document files, and a rasterizing unit to selectively rasterize pages of the received print job based on the print page range, so that the sequential target pages, including at least (i) pages between the print start page and a last page of the one document file and (ii) pages between a first page and the print end page of the other one document file, are rasterized, and the pages other than the sequential target pages are not rasterized. The sequential target pages are printed and the pages of the print job other than the sequential target pages are not printed.

31 Claims, 8 Drawing Sheets

(51) Int. Cl.
*H04N 1/60* (2006.01)
*G06K 15/02* (2006.01)
*G06F 3/12* (2006.01)

(52) U.S. Cl.
CPC .......... *G06F 3/1242* (2013.01); *G06F 3/1247* (2013.01); *G06F 3/1248* (2013.01); *G06F 3/1285* (2013.01); *G06K 15/181* (2013.01); *G06K 15/1836* (2013.01); *G06K 2215/0011* (2013.01)

(58) Field of Classification Search
CPC ....... H04N 2201/0094; G06K 15/1806; G06K 15/181; G06K 15/1836; G06F 3/1215; G06F 3/124; G06F 3/1242; G06F 3/1247; G06F 3/1248; G06F 3/1285
USPC ................................. 358/1.9, 1.1, 1.15, 1.18
See application file for complete search history.

(56) References Cited

U.S. PATENT DOCUMENTS

| | | | | |
|---|---|---|---|---|
| 2003/0103071 | A1* | 6/2003 | Lusen | G06F 17/241 715/705 |
| 2007/0030507 | A1* | 2/2007 | Kaneko | G06F 3/1204 358/1.13 |
| 2013/0070292 | A1* | 3/2013 | Ohkawa | G06K 15/1813 358/1.15 |
| 2015/0220820 | A1 | 8/2015 | Kaneda | |

OTHER PUBLICATIONS

Microsoft: "How to print a range of pages in a multiple-section document in Word 2002", Jun. 12, 2015 (Jun. 12, 2015), XP055315361,Retrieved from the Internet: https://support.microsoft.com/en-us/kb/290984#bookmark-2 (retrieved Nov. 1, 2016).

* cited by examiner

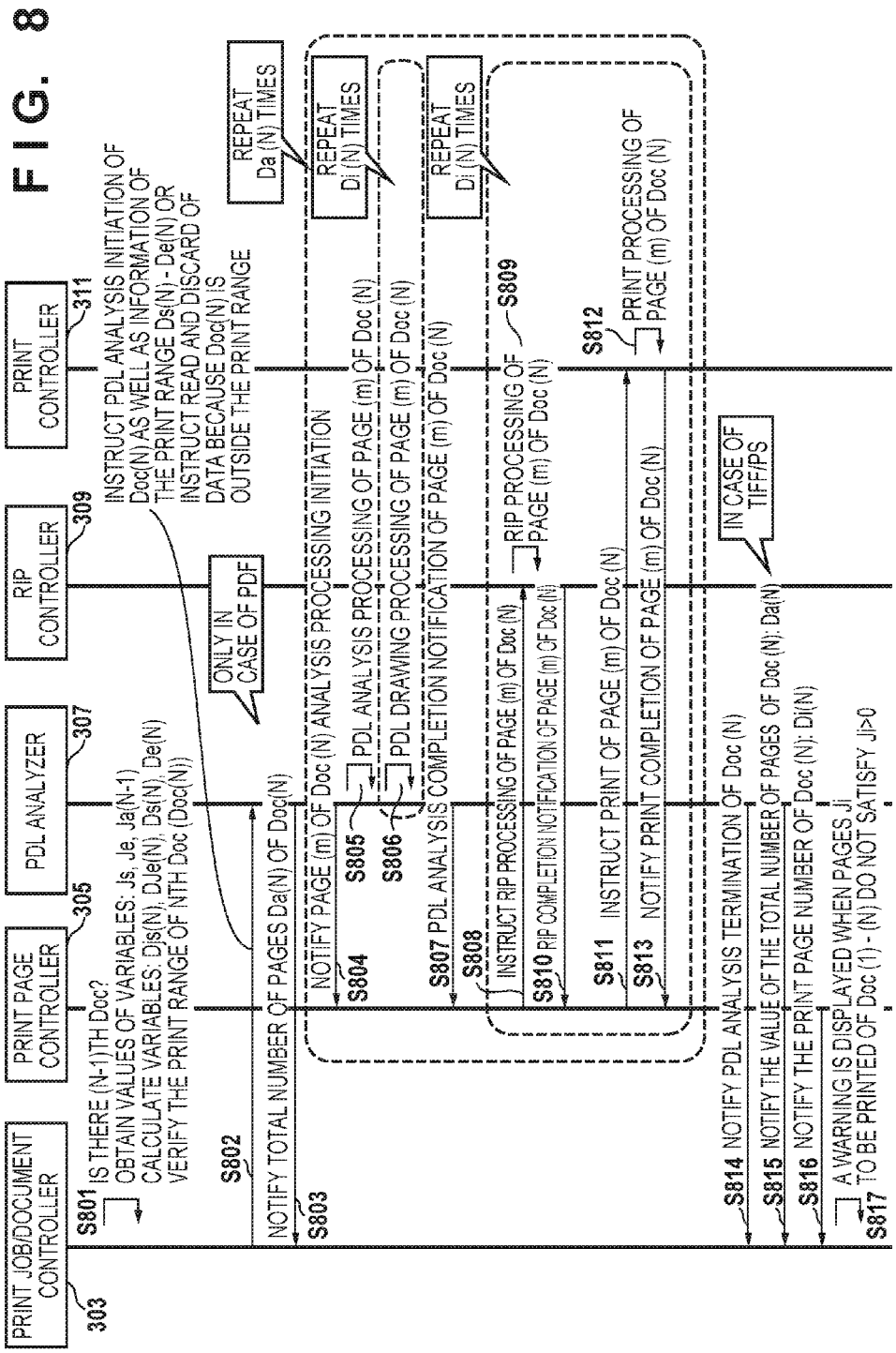

PRINT CONTROL APPARATUS, AND PRINT CONTROL METHOD FOR SELECTIVELY RASTERIZING PRINT DATA

BACKGROUND OF THE INVENTION

Field of the Invention

The present invention relates to a print control apparatus and a print control method.

Description of the Related Art

There is a function in which in a case where print data is transmitted to a printing apparatus from a host terminal such as a PC or a mobile device to cause the printing apparatus to print, it is possible to instruct a print page range by specifying pages, for example, on that host terminal. Also, when generating such print data on the host terminal, sometimes one print job includes a plurality of PDL files. In a case that a print page range for a print job including a plurality of PDL files is specified in this way, pages to be printed and page numbers of documents corresponding to each PDL file and the entire print job cannot be specified at a stage of analyzing the PDL file. For this reason, even if the specified print page range is a part of the plurality of PDL files, for example, an analysis of PDL files and RIP processing are performed with respect to all pages of all files, and then when printing, narrowing down to pages of the target range is first performed and then print processing is executed.

In Japanese Patent Laid-Open No. 2011-110900, a technique is recited for solving a problem in that in direct printing of PDF (Portable Document Format) files and the like, a total number of pages of print data cannot be displayed, and also because of this, a specified page range cannot be printed. According to this, specific identifiers to be used in the calculation of the number of pages in the document from one or two or more print data items being stored in an external storage medium are extracted, and the total number of pages of a document is calculated based on the extracted identifiers.

However, with the above described conventional technique, as previously mentioned, if a print page range is specified in relation to a print job including a plurality of files for which the total number of pages is unclear, the problem that it is necessary to execute PDL analysis and RIP processing in relation to pages outside of the print page range cannot be solved. In this way, conventionally, because PDL analysis and RIP processing have been executed in relation to pages outside the print target when a print page range is specified in relation to a print job including a plurality of files, there has been a problem in that unnecessary processing occurs when printing, and as a consequence the processing time becomes longer.

SUMMARY OF THE INVENTION

An aspect of the present invention is to eliminate the above-mentioned problems that are found in the conventional technology.

A feature of the present invention is to provide a technique in which, even when a print page range is specified in relation to a print job including a plurality of files, printing can be performed with a shortened processing time.

According to a first aspect, the present invention provides a print control apparatus comprising a receiving unit configured to receive a print job with a print page range indicating target pages selected among all pages of the print job, the print job including a plurality of documents, the target pages including pages of different documents, and a rasterizing unit configured to selectively rasterize the received print job according to the print page range, so that the target pages are rasterized and pages among the all pages other than the target pages are not rasterized.

According to a second aspect, the present invention provides a print control method comprising receiving a print job with a print page range indicating target pages selected among all pages of the print job, the print job including a plurality of documents, the target pages including pages of different documents, and selectively rasterizing the received print job according to the print page range, so that the target pages are rasterized and pages among the all pages other than the target pages are not rasterized.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 depicts a view for describing a processing sequence of a print job/document controller, a print page controller, a PDL analyzer, a RIP controller, and a print controller of the image forming apparatus according to the embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
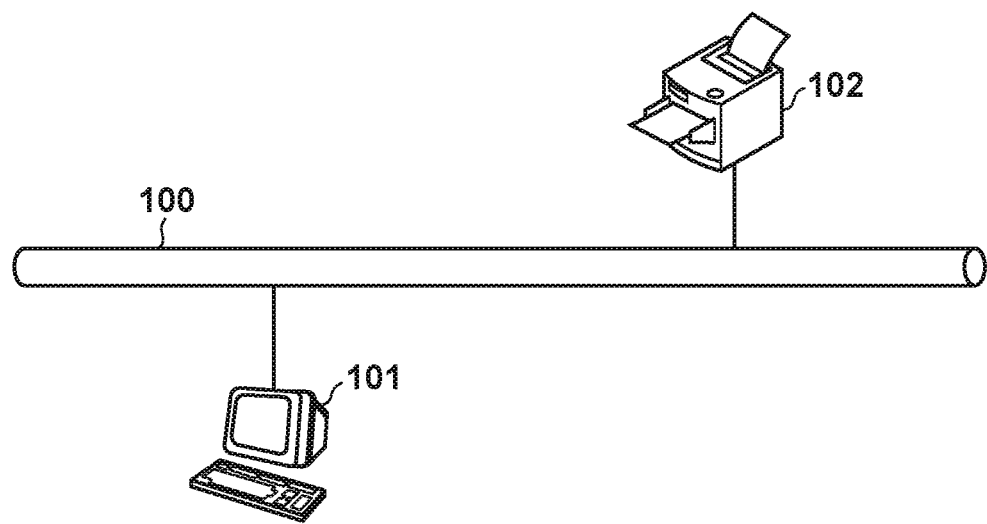
FIG. 1 depicts a view illustrating an example configuration of a print system according to an embodiment of the present invention.

FIG. 1 depicts a view illustrating an example configuration of a print system according to the embodiment of the present invention.

In the print system, a host terminal 101 that generates print data and supplies it to an image forming apparatus 102, and the image forming apparatus 102, which receives the print data, and executes print processing based on the print data, are connected via a network 100.

Figure 2:
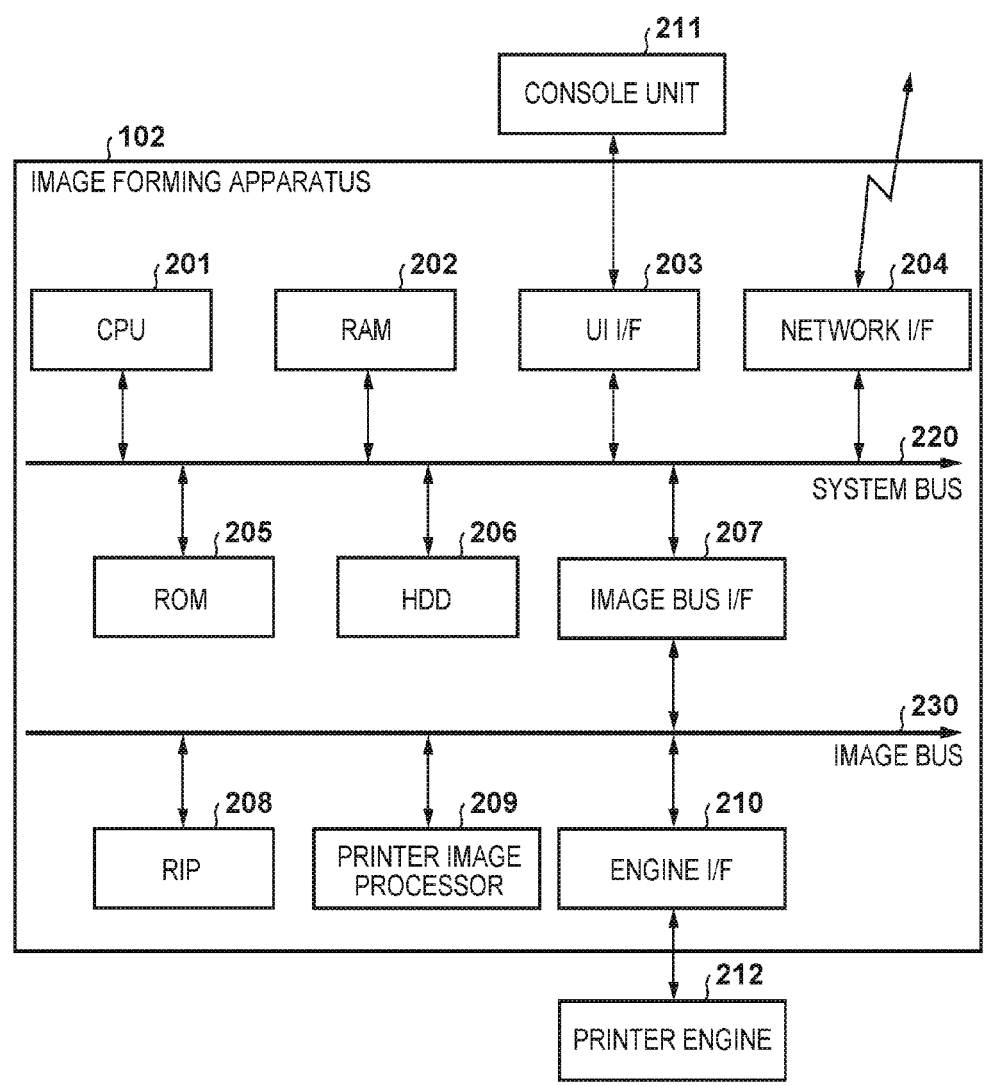
FIG. 2 is a block diagram for describing a hardware configuration of an image forming apparatus according to the embodiment.

FIG. 2 is a block diagram for describing a hardware configuration of the image forming apparatus 102 according to the embodiment.

To a system bus 220, a CPU 201, a RAM 202, a UI (user interface) I/F 203, a network I/F 204, a ROM 205, and an HDD (hard disk drive) 206 are connected and perform communication with each other. The components on the system bus 220, via an image bus I/F 207, access an RIP (Raster Image Processor) 208, a printer image processor 209, and an engine I/F 210 which are connected to an image bus 230. The UI I/F 203 is connected to a console unit 211 and notifies signals that are from the console unit 211 to each module. The network I/F 204 receives PDL (page description language) data from the host terminal 101 via the network 100, and the CPU 201 stores them to the HDD 206. The ROM 205 stores various parameters and programs necessary for execution of activation and processing of the image forming apparatus 102, and is accessed from each software module as necessary. The HDD 206 provides a temporary storage region for the PDL data received via the network 100, and a data swap region of the RIP 208 and the printer image processor 209. The image bus I/F 207 executes a data exchange between the image bus 230 and the system bus 220 of the image forming apparatus 102, and mediates communication between the system bus 220 on which control system software operates, and modules relating to image processing that operate on the image bus 230. The RIP 208 which is connected to the image bus 230 renders (converts) a page description language (PDL) code into an image file. The conversion is called rasterizing or rendering. The printer image processor 209 performs correction processing or a conversion to a resolution suited to a printer engine 212 in relation to the image file generated by the RIP 208. The engine I/F 210 is a communication I/F for controlling the printer engine 212.

Figure 3:
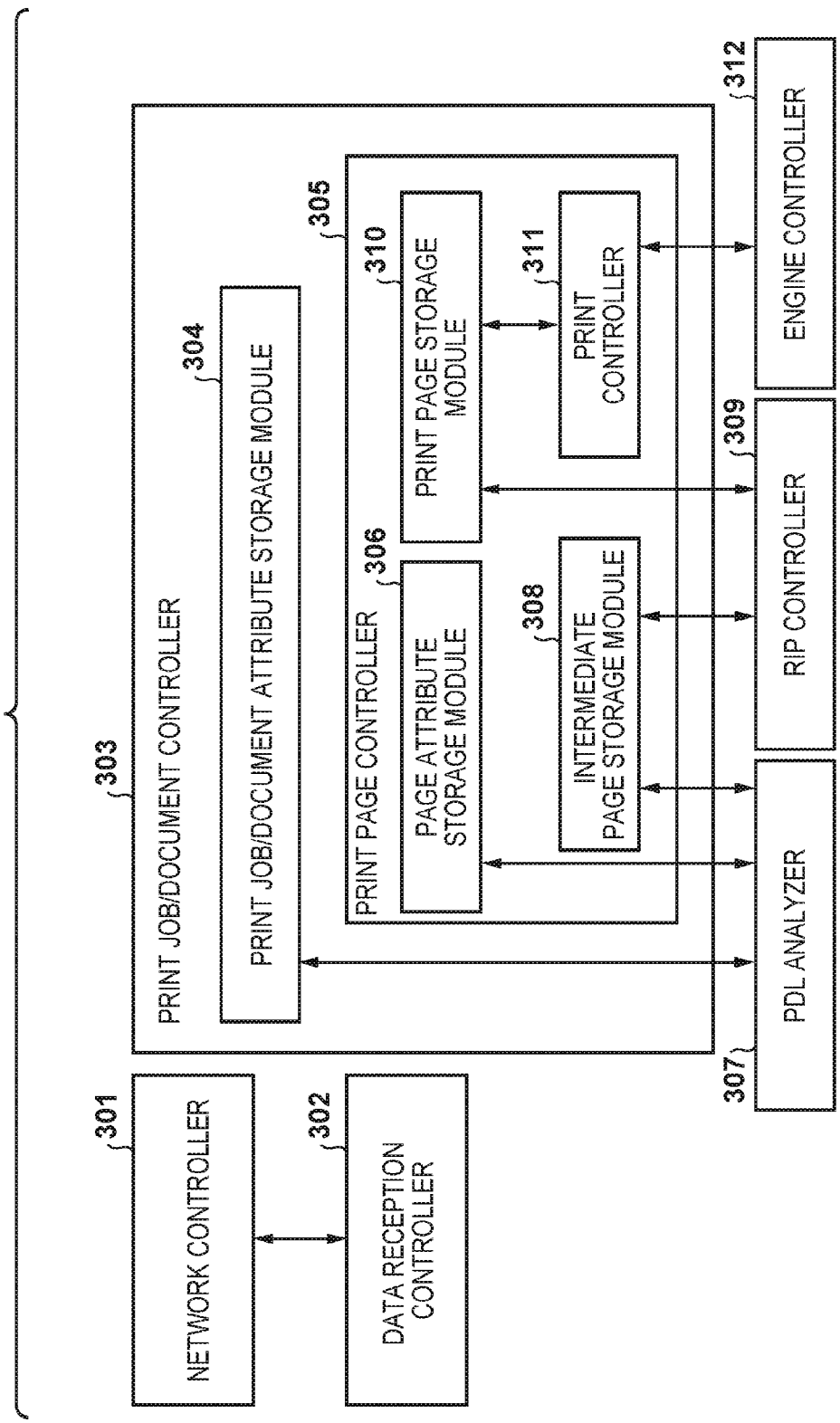
FIG. 3 is a functional block diagram for describing a software configuration of the image forming apparatus according to the embodiment.

FIG. 3 is a functional block diagram for describing a software configuration of the image forming apparatus 102 according to the embodiment. A function of each unit of FIG. 3 is realized by the CPU 201 executing a program deployed into the RAM 202 from the HDD 206 or the ROM 205.

The network I/F 204 provides a TCP/IP socket I/F to a network controller 301. An application which generates PDL data from the host terminal 101 side transmits PDF/PS/TIFF etc. format data by a RAW/LPR etc. data transmission protocol. In the image forming apparatus 102, the network controller 301 receives the PDF/PS/TIFF data by the RAW/LPR communication protocol, and passes the data to a data reception controller 302, and the data reception controller 302 writes and stores the data to the HDD 206. A print job/document controller 303 manages a sequence of processes from a reception of document data which configures the print job until a print completion. Here, when one job includes a plurality of document data items, and the documents are included in a print page range, a PDL analyzer 307 is caused to operate a plurality of times in units of documents. Also, a RIP controller 309 and a print controller 311 are caused to operate as necessary to create image data for printing. Also, the print job/document controller 303 reads and discards data stored by the data reception controller 302 through the PDL analyzer 307 if data of a processing target document is outside the print page range. Attribute information of the document and the job generated at the time of PDL analysis is stored in a print job/document attribute storage module 304. The page processing of each document (PDL analysis, RIP, and print control) is controlled by a print page controller 305.

The print job/document attribute storage module 304 receives setting information attached to the document and the print job from the print job/document controller 303, and stores the setting information in units of documents and in units of jobs. In this way, the stored information is referred to as necessary for job control and page control.

The print page controller 305, the PDL analyzer 307, the RIP controller 309 and the print controller 311 cooperate and perform processing pages included in the print page range. At that time, the page attribute obtained when the page is analyzed is stored in a page attribute storage module 306. The print page controller 305 receives an initiation notification of the document process from the PDL analyzer 307, requests a rendering process and a PDL analysis to the PDL analyzer 307, and stores intermediate page data to an intermediate page storage module 308 after the process has terminated. Continuing, the print page controller 305 requests for RIP processing to the RIP controller 309 and stores image data extracted by the RIP processing to a print page storage module 310 after termination of the RIP processing. Finally, the print controller 311 prints an image based on image data for which RIP has completed which is being stored in the print page storage module 310.

The page attribute storage module 306 receives page attributes obtained by the PDL analysis processing from the print page controller 305, and references these as necessary in accordance with requests from each module.

The PDL analyzer 307, in accordance with instructions of the print job/document controller 303, performs rendering processing and PDL analysis of received print jobs and generates the intermediate page data. Then, the PDL analyzer 307 generates a page attribute of each page and a document attribute of the document, and transfers those to the print job/document controller 303 and the print page controller 305 respectively. Also, the PDL analyzer 307, by the print job/document controller 303, obtains information of the print page range Ds(N) through De(N) of an Nth document. If a page number (m) during the analysis is in the print page range Ds(N) through De(N), the PDL analysis processing is applied, and rendering processing of the intermediate data for RIP processing is performed. However, if outside the print page range, only an obtainment of information necessary for the analysis of a subsequent page is performed, and the rendering processing is omitted. Also, by searching the information relating to a total number of pages of a document: Da(N) from the PDL data or by counting the total number of pages analyzed, a total number of pages of the received print job data is notified as Da(N) to the print job/document controller 303.

The intermediate page storage module 308 temporarily stores the intermediate page data for which the PDL analyzer 307 performed rendering until the RIP processing of the preceding page finishes. The RIP controller 309 performs RIP processing on the intermediate page data stored in the intermediate page storage module 308, stores the image data after the RIP processing in the print page storage module 310, and waits for the print processing by the print controller 311. The print controller 311 reads out the image data for printing in the print order from the print page storage module 310 then transfers to an engine controller 312 to cause printing.

Figure 4:
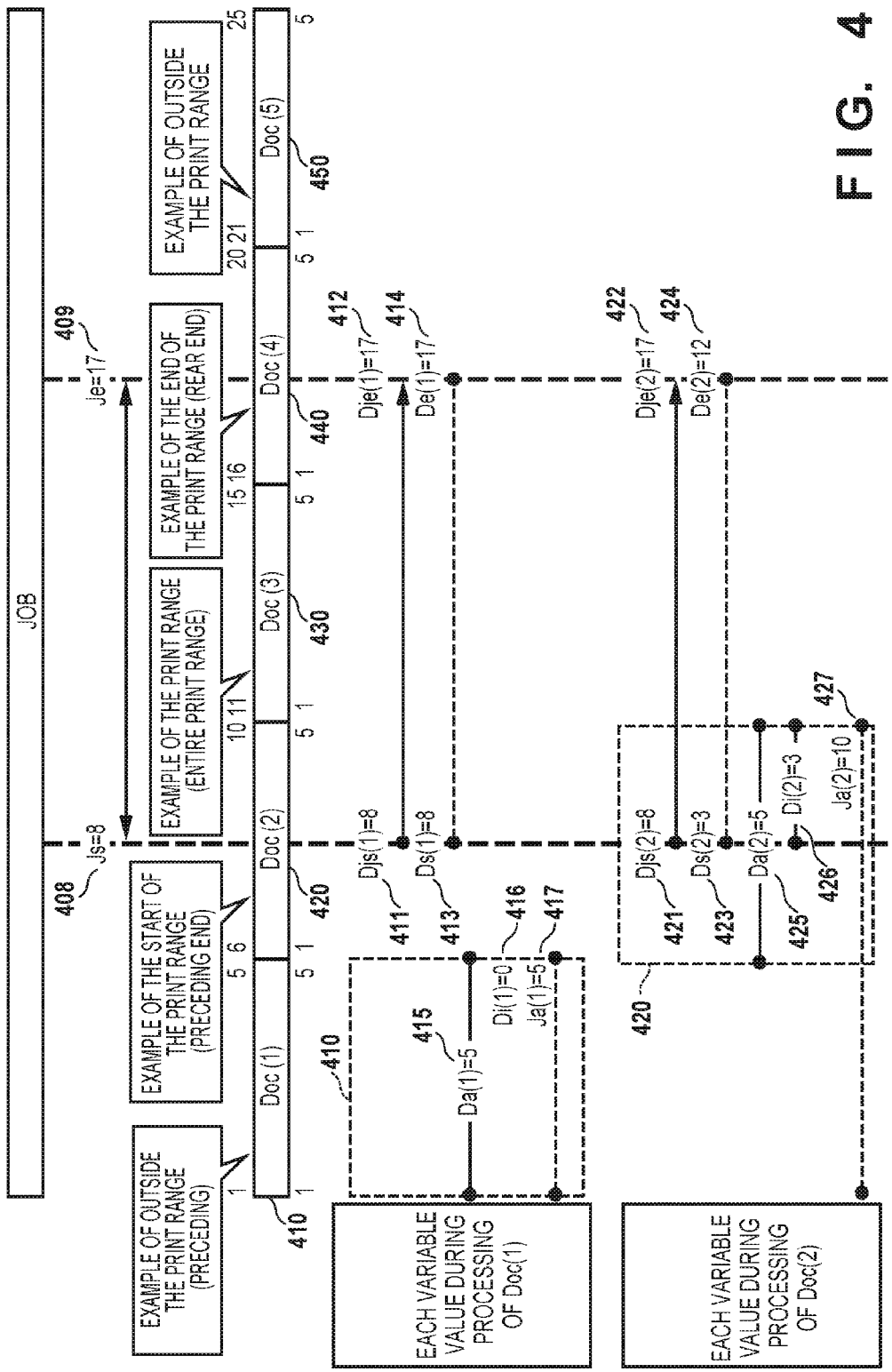
FIG. 4 and FIG. 5 depict views for describing a change of variables involved in an analysis of each document when the image forming apparatus according to the embodiment receives a print job which includes five documents, and a print page range is specified.
Figure 5:
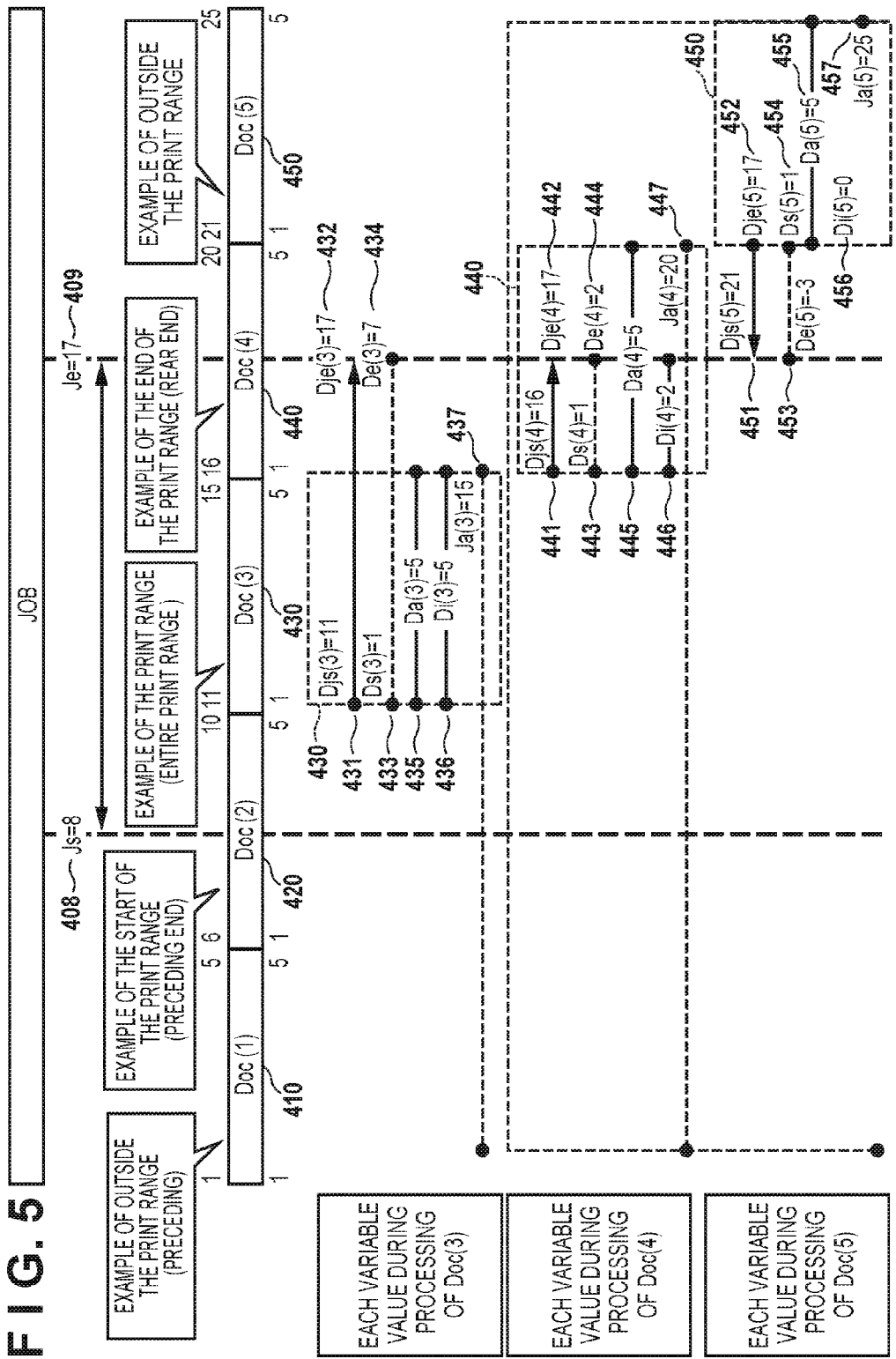

FIG. 4 and FIG. 5 depict views for describing a change of variables involved in an analysis of each document when the image forming apparatus 102 according to the embodiment receives a print job which includes five documents, and a print page range is specified.

One print job includes five PDL data items (documents (Doc (1)) through (Doc (5)) 410, 420, 430, 440, and 450) (Such as a PDF or a TIFF file), and each document is configured by five pages, and becomes document data of 25 pages in the entire print job. A print page range of page 8 through page 17 is set for the print job. By this, the document 410 (Doc (1)) is a document before the print page range, and the document 420 (Doc (2)) is a document in which the head of the print page range is included. Furthermore, the document 430 (Doc (3)) is a document completely included in the print page range, the document 440 (Doc (4)) is a document in which the final page of the print page range is included, and the document 450 (Doc (5)) is a document outside the print page range. Note, configuration may also be taken such that settings of the print page range are included in the print job, or such that a user can specify the settings via the console unit 211 of the image forming apparatus 102.

Here, the document 410 (Doc (1)), 420 (Doc (2)), 430 (Doc (3)), 440 (Doc (4)), and 450 (Doc (5)) indicate the first through fifth documents. "An external input variable" and "an internal arithmetic variable" employed by the print job/document controller 303 and the PDL analyzer 307 which are necessary for when these first through fifth documents are processed are described.

Here, "external input variables" Js and Je which set the print page range are set as the print job settings. Here, Js, as denoted by reference numeral 408 in FIG. 4, denotes a print initiation page "8" in the print job, and Je, as denoted by reference numeral 409, denotes a print termination page "17" in the print job. Js and Je are job attribute values for when the host terminal 101 generates a print job, and the print job/document controller 303 of the image forming apparatus 102 reference these attribute values.

In contrast, variables which are described as items (A) through (H) described later are computed within the image forming apparatus 102. A parameter necessary for an Nth document process (in other words, processing of the subsequent document) is calculated based on Js, Je, and the variables for the time of the ((N−1)th) document one previous (in other words, the processing of the preceding document). A calculation equation is described as follows. The variables which are described by items (A) through (F) and (H) are values calculated by the print job/document controller 303, and the variable (variable De(N)) which is described by item (F) is obtained by the PDL analyzer 307. Note, these variables are stored in the RAM 202.

(A) Variable Ja(N) indicates the total number of pages of the 1 through Nth documents. For example, Ja(2) is a sum total of a number of pages of the first and second documents. The print job/document controller 303 calculates this by Ja(N)=Ja(N−1)+Da(N) prior to Nth document processing initiation (step S604 of FIG. 6). Here Da(N) is a total number of pages of the Nth document.

In FIG. 4 and FIG. 5, Ja (total number of pages) of the first to fifth documents is denoted by each reference numeral 417 (Ja(1)=5), 427 (Ja(2)=10, 437 (Ja(3)=15), 447 (Ja(4)=20), 457 (Ja(5)=25).

(B) Variable Ji(N) indicates a sum total the pages to be printed of the 1 through Nth documents. The print job/document controller 303 calculates this by Ji(N)=Ji(N−1)+Di(N) after the Nth document processing termination (step S609). Here, Di(N) is the total number of pages to be printed of the Nth document.

Variable Ji(N) after processing of the first through fifth documents, Ji(1)=0, Ji(2)=3, Ji(3)=8, Ji(4)=10, and Ji(5)=10. Note, the variable Ji(N) is not indicated in FIG. 4 and FIG. 5.

(C) Variable Djs(N) indicates the print initiation page in units of jobs of the Nth document. The print job/document controller 303 calculates prior to the Nth document processing initiation (step S604) by the following equation.

If Ja(N−1)<Js (print initiation page), then Djs(N)=Js
If Ja(N−1)≥Js, then Djs(N)=Ja(N−1)+1

In FIG. 4 and FIG. 5, the variable Djs(N) of the first to fifth documents is denoted by each reference numeral 411 (Djs(1)=8), 421 (Djs(2)=8), 431 (Djs(3)=11), 441 (Djs(4)=16), and 451 (Djs(5)=21).

(D) Variable Dje(N) indicates the print termination page in units of jobs of the Nth document. The print job/document controller 303 calculates this by Dje(N)=Je (print termination page) prior to the Nth document processing initiation (step S604).

In FIG. 4 and FIG. 5, the variable Dje(N) of the first to fifth documents is denoted by each reference numeral 412 (Dje(1)=17), 422 (Dje(2)=17), 432 (Dje(3)=17), 442 (Dje(4)=17), and 452 (Dje(5)=17).

(E) Variable Ds(N) indicates the print initiation page in units of documents of the Nth document. The print job/document controller 303 calculates this by Ds(N)=Ds(N−1)+Djs(N) prior to the Nth document processing initiation (step S604). In FIG. 4 and FIG. 5, the variable Ds(N) of the first to fifth documents is denoted by each reference numeral 413 (Ds(1)=8), 423 (Ds(2)=3), 433 (Ds(3)=1), 443 (Ds(4)=1), and 453 (Ds(5)=1).

(F) Variable De(N) indicates the print termination page in units of documents of the Nth document. The print job/document controller 303 calculates this by De(N)=Je−Ja(N−1) prior to the Nth document processing initiation (step S604).

In FIG. 4 and FIG. 5, the variable De(N) of the first to fifth documents is denoted by each reference numeral 414 (De(1)=17), 424 (De(2)=12), 434 (De(3)=7), 444 (De(4)=2), and 454 (De(5)=−3).

(G) Variable Da(N) indicates the total number of pages of the Nth document. The PDL analyzer 307 analyzes the Nth document of a received print job, and obtains the total number of pages included in the print job. This is notified to the print job/document controller 303 in step S803 (FIG. 8) in the case of a PDF, and in step S815 (FIG. 8) in the case of a PS/TIFF. The print job/document controller 303, having received the notification, stores the notified value as Da(N), and uses it in a calculation of the number of pages (Ja(N)) of the entire print job. In FIG. 4 and FIG. 5, the variable Da(N) of the first to fifth documents is denoted by each reference numeral 415 (Da(1)=5), 425 (Da(2)=5), 435 (Da(3)=5), 445 (Da(4)=5), and 455 (Da(5)=5).

(H) Variable Di(N) indicates the number of pages in the print page range of the Nth document. The PDL analyzer 307 determines that the Nth document is within the print page range, the number of pages for which PDL analysis, RIP processing, the print process are performed are counted, and this is stored as Di(N) when processing is terminated for an Nth document by the print page controller 305. In FIG. 4 and FIG. 5, the variable Di(N) of the first to fifth documents is denoted by each reference numeral 416 (Di(1)=0), 426 (Di(2)=3), 436 (Di(3)=5), 446 (Di(4)=2), and 456 (Di(5)=0).

Figure 6:
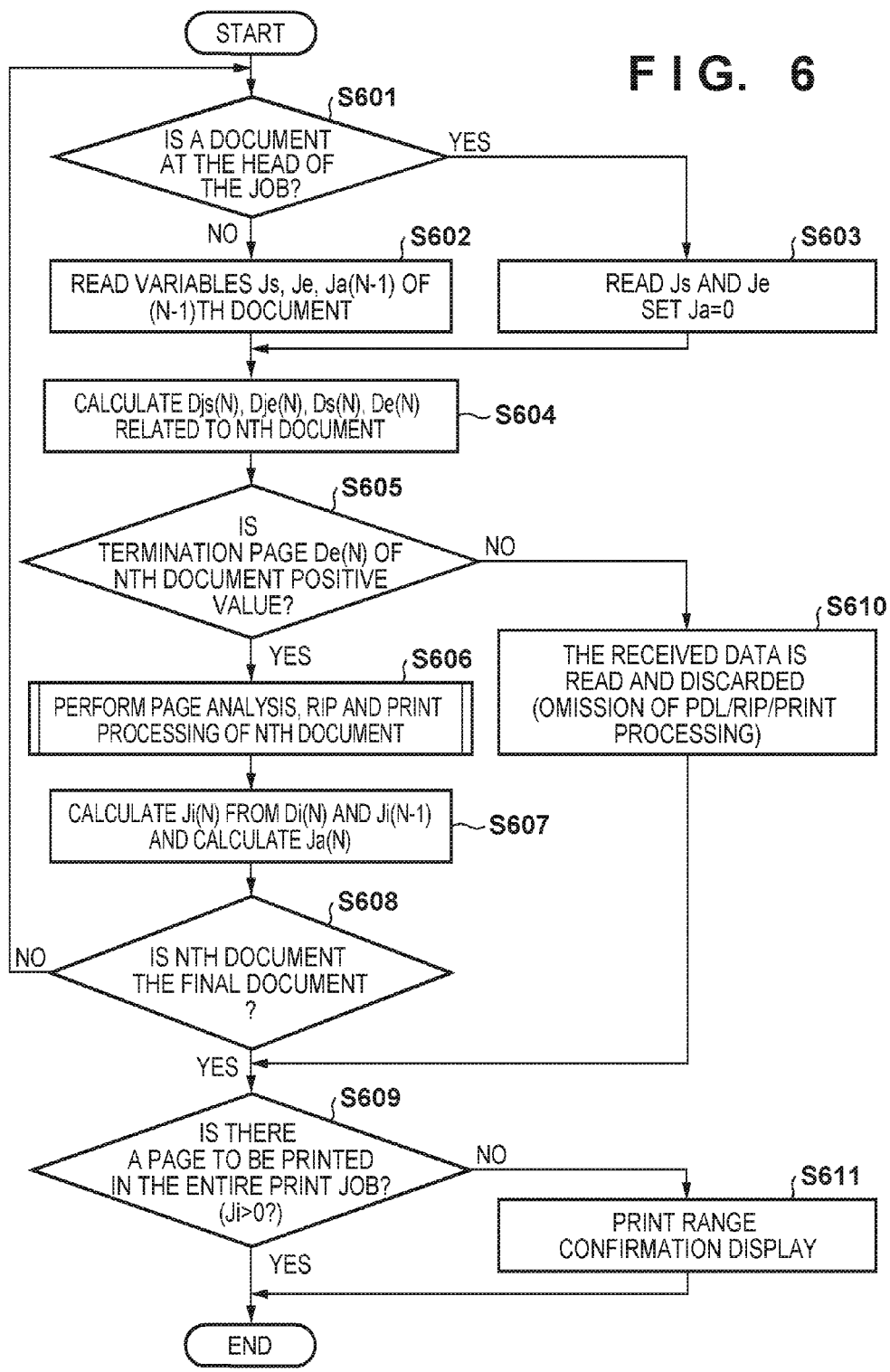
FIG. 6 is a flowchart for describing an analysis process of the print job in the image forming apparatus according to the embodiment.

FIG. 6 is a flowchart for describing print job analysis processing in the image forming apparatus 102 according to the embodiment. Note, a program for executing the process is saved to the ROM 205 or the HDD 206, and when executed, realizes the processing described in the flowchart by being deployed in the RAM 202 and executed under the control of the CPU 201. The process is a process for calculating each kind of internal variable necessary for document processing and document processing of the print job/document controller 303. Here, the subject of the process is described as the CPU 201.

When the process is initiated, a variable N=1 is set. First, the CPU 201 in step S601, when processing of an Nth document is initiated, determines whether or not an (N−1)th document exists, in other words, whether or not it is the head document of the print job. When it is determined to be the head document, the processing proceeds to step S603, and when it is determined not to be the head document, the processing proceeds to step S602. The CPU 201 in step S602 reads variables Js and Je when processing of the Nth document is initiated, and also reads the value of Ja(N−1) (the total number of pages until the (N−1)th document) for when the (N−1)th document was processed, and the processing proceeds to step S604. Here, the variables Js and Je are the print initiation page and the print termination page respectively. However, when the head document is determined in step S601, an initial value "0" is set to Ja(N), and the values above described of variables Js and Je are read in step S603, and the processing proceeds to step S604.

The CPU 201 in step S604, at a time of Nth document processing initiation, calculates the variables Djs(N), Dje(N), Ds(N), and De(N) for the Nth document by the previously described calculation equation. Here, Djs(N) and Dje(N) are respectively the print initiation page and the print termination page of units of jobs of the Nth document, and Ds(N) and De(N) are the print initiation page and the print termination page in units of documents of the Nth document, respectively. Next, the processing proceeds to step S605, and the CPU 201 references De(N) obtained in step S604, and if De(N)>0 then the processing proceeds to step S606, and if De(N)≤0 then the processing proceeds to step S610 since it is outside the print page range, the document data is read and discarded, and the processing proceeds to step S609.

The CPU 201, in step S606, performs document page processing of the Nth document. Details of the processing is described later referencing the flowchart of FIG. 7.

Next, the processing proceeds to step S607, and the CPU 201 calculates Ji(N) (total number of pages to be printed from the first to the Nth documents) and Ja(N) (a total number of pages of the first to Nth documents) and the processing proceeds to step S608. The CPU 201 in step S608 terminates the processing of the Nth document, determines whether or not the Nth document is the final document, and in a case that it is not the final document, "1" is added to the variable N, the processing returns to step S601, and the previously described processing is executed.

However, when it is determined to be the final document, the processing proceeds to step S609 and the CPU 201 calculates Ji (a number of pages to be printed of the entire job), whether or not Ji>0, in other words, determines whether or not there is a page to be printed. When a page to be printed exists, the processing terminates, and when one does not exist the processing proceeds to step S611 and the CPU 201 displays that there are no pages to be printed on the console unit 211, in other words, the number of pages in the print page range is "0", and the processing is terminated.

Figure 7:
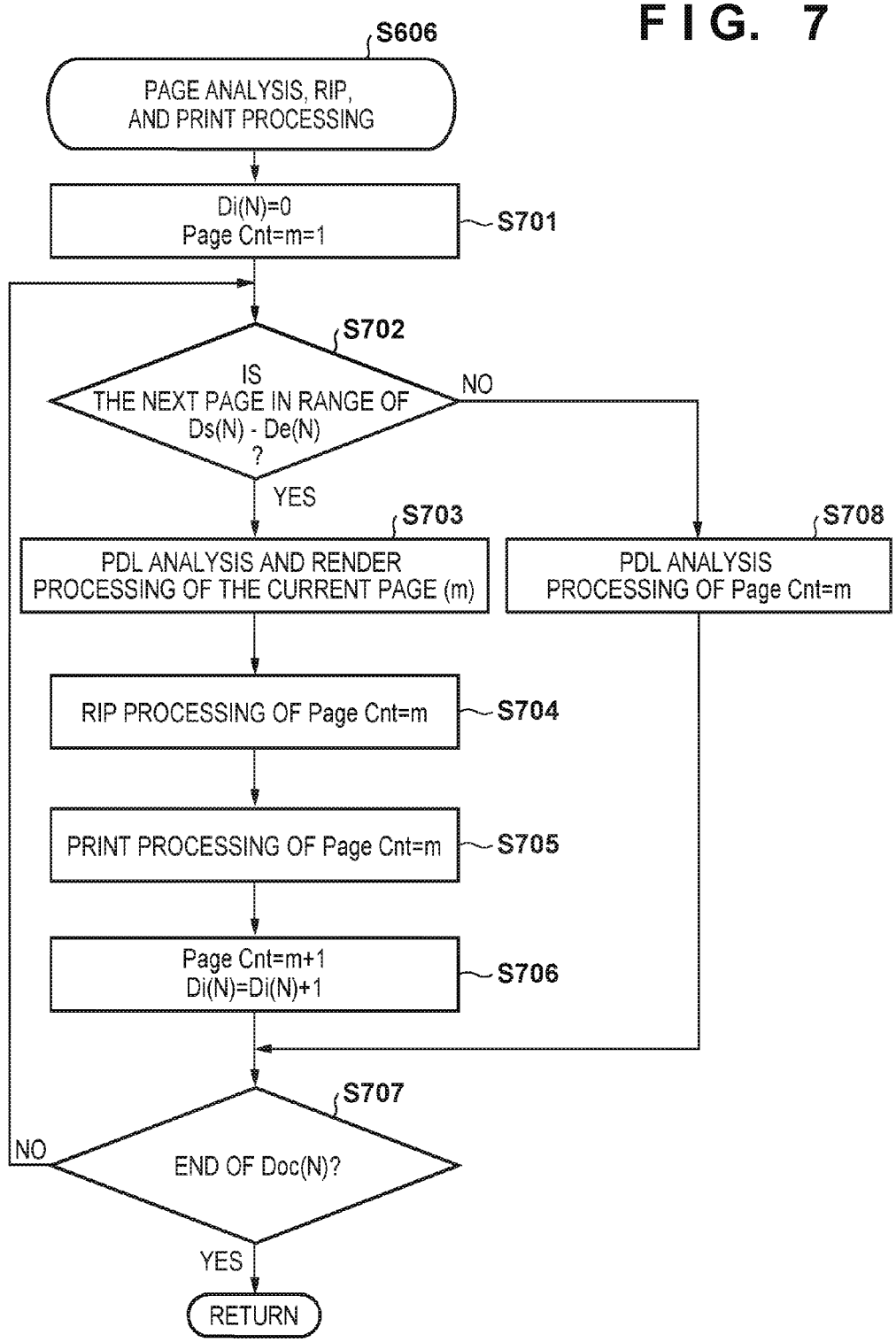
FIG. 7 is a flowchart for describing a process of step S606 of FIG. 6.

FIG. 7 is a flowchart for describing a process of step S606 of FIG. 6.

First, the CPU 201 in step S701 initializes the number Di(N) of pages to be printed of Nth document to "0" and initializes a value (m) of the page number (Page Cnt), which is subsequently processed in the Nth document N, to "1". Next, the processing proceeds to step S702 and the CPU 201, in regards to the Nth document, determines whether or not the next to be processed page number (m) is within the range of Ds(N) through De(N), in other words, is included in the print page range. When it is determined that it is included in the print page range, the processing proceeds to step S703, and the CPU 201 performs the PDL analysis and the rendering processing of the page (m), and the processing proceeds to step S704. The CPU 201 in step S704 performs RIP processing of the page (m) and the processing proceeds to step S705, and outputs the image data of the page (m) to the printer engine 212 via the engine I/F 210 to print. Next, the processing proceeds to step S706 and the CPU 201 increments the target page number (m) in the print page range of the Nth document, this is stored in Di(N), and the processing proceeds to step S707. The CPU 201 in step S707 determines whether printing of all pages of the Nth document terminated, and if it determines that printing has terminated, then this processing terminates, otherwise if subsequent pages exist then the processing proceeds to step S702.

Also, the CPU 201, in step S702, in regards to the Nth document, if it is determined that the next to be processed page number (m) is not included in the print page range, then the processing proceeds to step S708. The CPU 201 in step S708 performs only the PDL analysis processing because the page (m) is not included in the pages to be printed, and "1" is added to the page number (m). Then, PDL rendering processing (step S703), the RIP processing (step S704), and the print processing (step S705) are skipped, and the processing proceeds to step S707.

In this way, it is possible that only image data of a page of the document included in the print page range is extracted and printed.

FIG. 8 depicts a view for describing a processing sequence of the print job/document controller 303 of the image forming apparatus 102, the print page controller 305, the PDL analyzer 307, the RIP controller 309, and the print controller 311 according to the embodiment.

Step S801 indicates internal processing of the print job/document controller 303 and corresponds to step S601 through step S604 of FIG. 6. Here, it is determined whether or not it is the head document, the variables Js (print initiation page) and Je (print termination page) are read, and also the value of Ja(N−1) (the total number of pages until the (N−1)th document) when the (N−1)th document is processed is read. Additionally, the variables Djs(N), Dje(N), Ds(N), and De(N) are calculated for the Nth document. Also, the print page range of the Nth document is verified.

Next, in step S802, PDL analysis processing of the Nth document (Doc(N)) is instructed from the print job/document controller 303 to the PDL analyzer 307 with Ds(N) and De(N) as the print page range of the Nth document. Also, if the Nth document is outside the print page range, the document data is instructed to be read and discarded. At that time, only if the data format of the PDL analysis target of the document data is PDF, the PDL analyzer 307 notifies "the total number Da(N) of pages of the Nth document" to the print job/document controller 303 at a timing of step S803. This value is used for the calculation of the number Ja(N) of pages of the entire print job in step S607 of FIG. 6. However, in the case of data format (such as PS or TIFF) of the analysis target other than PDF, the PDL analyzer 307 notifies the total number Da(N) of pages of the Nth document to the print job/document controller 303 at a timing of step S815.

The PDL analyzer 307 in step S804 notifies processing initiation relating to the page (m) of the Nth document to the print page controller 305. Then, the PDL analyzer 307 in step S805 performs the PDL analysis processing of the page (m). Next, in step S806, only in a case of the page (m) being included in a print page range specification Ds(N) through De(N), the rendering processing of the page (m) is performed. The processing is repeatedly executed for the number of pages Di(N) within the print page range of the Nth document.

Next, in step S807, completion of the PDL analysis processing of the page (m) is notified to the print page controller 305 from the PDL analyzer 307. Furthermore, only in a case of the page number (m) being included in a print page range Ds(N) through De(N), the RIP processing in step S808 through step S810 and the print processing in step S811 through step S813 are performed.

Specifically, the RIP processing is instructed to the RIP controller 309 from the print page controller 305 in step S808, and the RIP controller 309 performs the RIP processing of the page (m) in step S809. Then in step S810, completion of the RIP processing is notified to the print page controller 305 from the RIP controller 309. Then, the printing of the page (m) of the Nth document is instructed to the print controller 311 from the print page controller 305 in step S811, and the print controller 311 executes the print process of the page (m) in step S812. Then, the print controller 311 notifies the print completion of the page (m) of the Nth document to the print page controller 305 in step S813.

Next, the PDL analyzer 307 notifies a termination of analysis of the Nth document to the print job/document controller 303 in step S814. Then, in step S816, the print job/document controller 303 calculates the pages Ji to be printed regarding the entire print job, and if Ji>0 is not satisfied, in step S817, the print job/document controller 303 warns the user that there are no pages to be printed.

By virtue of this embodiment as explained above, the PDL analysis and rendering, RIP, and print processing are executed for the pages of the document included in the print page range, and the PDL rendering, RIP, and print processing are omitted for the pages outside the print page range. In other words, only the PDL analysis is executed for the pages outside the print page range. Further, the data itself is read and discarded (discarded) and the PDL analysis processing is also omitted for a document not included in the print page range. Thus, in the example above, since the PDL rendering, RIP, and print processing are performed only for the pages within the print page range of the 2nd document 2 through the 4th document, there is the effect that the processing time of the entire job can be shortened when the print page range is specified for a print job which includes a plurality of documents as in the problem to be solved.

OTHER EMBODIMENTS

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-129202, filed Jun. 26, 2015, which is hereby incorporated by reference herein in its entirety.

What is claimed is:

1. A print control apparatus comprising:
a print controller including one or more processors and at least one memory, the print controller functioning as:
a receiving unit configured to receive, from an external device, a print job that includes a plurality of ordered document files, and a print page range indicating sequential target pages, an initial page in the sequential target pages corresponding to a print start page in one of the plurality of ordered document files, and a last page in the sequential target pages corresponding to a print end page in another one of the plurality of ordered document files; and
a rasterizing unit configured to selectively rasterize pages of the received print job based on the print page range, so that the sequential target pages, including at least (i) pages between the print start page and a last page of the one document file and (ii) pages between a first page and the print end page of the other one document file, are rasterized, and the pages other than the sequential target pages are not rasterized, wherein the sequential target pages are printed and the pages of the print job other than the sequential target pages are not printed.

2. The print control apparatus according to claim 1, wherein, based on the print page range, the rasterizing unit (i) does not rasterize pages from a first page to a page that immediately precedes the page corresponding to the print start page of the one document file, (ii) rasterizes the pages between the print start page and the last page of the one document file, (iii) rasterizes the pages between the first page and the print end page of the other one document file, and (iv) does not rasterize pages from a page that immediately succeeds the print end page and a last page of the other one document file.

3. The print control apparatus according to claim 1, wherein, based on the print page range, the rasterizing unit does not rasterize pages of the print job before that precede the print start page, (ii) rasterizes the sequential target pages, and (iii) does not rasterize pages of the print job that succeed the print end page.

4. The print control apparatus according to claim 3, wherein the print controller further functions as an analyzing unit configured to analyze a page of a document file, of the plurality of ordered document files,
wherein the analyzing unit (i) analyzes the pages of the print job that precede the print start page and the sequential target pages, and (ii) does not analyze the pages of the print job that succeed the print end page.

5. The print control apparatus according to claim 1, wherein the print controller further functions as:
a generating unit configured to generate, for each of the plurality of ordered document files, a second print page range for the document file based on (i) the print page range, and (ii) a total number of pages of all document files that precede the document file in the plurality of ordered document files, and
wherein the rasterizing unit specifies, for each document file of the plurality of ordered document files, pages of the document file according to the generated second print page range for the document file and rasterizes the specified pages of the document file.

6. The print control apparatus according to claim 1, further comprising a printer engine,
wherein the print controller further functions as:
a specifying unit configured, based on the print page range, to specify pages to be printed in one or more document files, of the plurality of ordered document files, that include pages corresponding to the print page range;
a control unit configured to control the rasterizing unit to rasterize a page specified to be printed by the specifying unit among pages included in the one or more document files, and to control the printer engine to print the rasterized page; and
a determination unit configured to determine whether or not to rasterize a document file, of the plurality of ordered document files, that succeeds another document file, based on a number of pages that are specified to be printed by the specifying unit among pages included in the other document file that precedes the document file.

7. The print control apparatus according to claim 6, wherein, based on (i) the received print page range, (ii) the number of pages that are specified to be printed in the other document file that precedes the document file, and (iii) a total number of pages included in the document file that precedes the subsequent document file, the specifying unit obtains a second print page range in units of document files for the document file, and specifies a page corresponding to the second print page range in units of document files as a page to be printed in the document file,
wherein the determination unit determines whether or not to rasterize the document file based on the obtained second print page range in units of document files.

8. The print control apparatus according to claim 1, wherein each of the plurality of ordered document files is described in PDL (Page Description Language).

9. The print control apparatus according to claim 1, wherein the print page range is set in the print job.

10. The print control apparatus according to claim 1, further comprising a setting unit configured to set the print page range.

11. The print control apparatus according to claim 6, wherein, if the determination unit determines that the document file is not rasterized, the control unit discards data of the document file without making the determination.

12. The print control apparatus according to claim 6, wherein the specifying unit obtains (i) document files, of the plurality of ordered document files, having pages included in the print page range included in the print job, and (ii) a document file print start page and a document file print end page for each of the document files to specify the print page range.

13. The print control apparatus according to claim 1, wherein, in a case that the print page range includes pages of at least three document files, of the plurality of ordered document files, the print page range is specified by (i) determining the one document file including the print start the other one document file including the print end page, and document files for which the entire document file is included in the print page range, and (ii) obtaining a document file print start page and a document file print end page for each of the one document file, the other one document file, and one or more document files that succeed the one document file and precede the other one document file in the plurality of ordered document files.

14. The print control apparatus according to claim 1, wherein the receiving unit receives the print job in which the print page range is not individually specified for each document file of the plurality of ordered document files.

15. The print control apparatus according to claim 1, wherein, if an intermediate document file is included between the one document file and the other one document file, of the plurality of ordered document files, in the print job, the rasterizing unit is configured to rasterize, based on the print page range of the initial document file and the print end page of the subsequent document file, all pages of the intermediate document file, and
wherein the sequential target pages include all of the pages of the intermediate document file.

16. A print control method comprising:
receiving, from an external device, a print job that includes a plurality of ordered document files, a print page range indicating sequential target pages, an initial page in the sequential target pages corresponding to a print start page in one of the plurality of ordered document files, and a last page in the sequential target pages corresponding to a print end page in another one of the plurality of ordered document files;
selectively rasterizing pages of the received print job based on the print start page and the print page range, so that the sequential target pages, including at least (i) pages between the print start page and a last page of the one document file and (ii) pages between a first page and the print end page of the other one document file, are rasterized, and the pages of the print job other than the sequential target pages are not rasterized; and
printing the sequential target pages that have been rasterized, wherein the pages of the print job other than the sequential target pages are not printed.

17. The print control method according to claim 16, wherein, based on the set of the print page range, the selective rasterizing includes:
(i) not rasterizing pages from a first page to a page that immediately precedes the print start page of the one document file;
(ii) rasterizing the pages between the print start page and the last page of the one document file;
(iii) rasterizing pages between the first page and the print end page of the other one document file; and
(iv) not rasterizing pages from a page that immediately succeeds the print end page and a last page of the other one document file.

18. The print control method according to claim 16, wherein, based on the print page range, the selective rasterizing includes:

(i) not rasterizing pages of the print job that precede the print start page;
(ii) rasterizing the sequential target pages; and
(iii) not rasterizing pages of the print job that succeed the print end page.

19. The print control method according to claim 18, further comprising analyzing a page of a document file, of the plurality of ordered document files,
wherein, during the analyzing, (i) the pages of the print job that precede the print start page and the sequential target pages are analyzed, and (ii) the pages of the print job that succeed the print end page are not analyzed.

20. The print control method according to claim 16, further comprising
generating, for each of the plurality of ordered document files, a second print page range for the document file based on (i) the print page range, and (ii) a total number of pages of all document files that precede the document file in the plurality of ordered document files,
wherein, for each document file, of the plurality of ordered document files, in the selective rasterizing:
(i) pages of the document file according to the generated second print page range for the document file are specified, and
(iii) the specified pages of the document file are rasterized.

21. A print control apparatus comprising:
a printer controller including one or more processors and at least one memory, the printer controller being configured to function as:
a receiving unit configured to receive, from an external device, (i) a plurality of ordered document files, and (ii) a print start page and a print end page that specify a print page range indicating sequential target pages to be printed, the print start page specifying, as an initial page of the sequential target pages, a page of one of the plurality of ordered document files, and the print end page specifying, as a last page of the sequential target pages, a page of another one of the plurality of ordered document files; and
a rasterizing unit configured to rasterize the sequential target pages indicated by the print page range and not to rasterize one or more pages of the plurality of ordered document files other than the sequential target pages, based on the print start page and the print end page,
wherein the sequential target pages that have been rasterized by the rasterizing unit are printed and the one or more pages of the document files other than the sequential target pages are not printed.

22. The print control apparatus according to claim 21, further comprising a printer engine that prints sequentially the target pages that have been rasterized by the rasterizing unit and does not print the one or more pages of the plurality of ordered document files other than the sequential target pages.

23. The print control apparatus according to claim 21, wherein, in order to rasterize the sequential target pages and not to rasterize the one or more pages of the plurality of ordered document files other than the sequential target pages, the rasterizing unit is configured:
to generate a document file page range for each document file of the plurality of ordered document files based on the received print start page and the print end page; and
to control, for each document file of the plurality of ordered document files, rasterization of pages of the document file based on the corresponding generated document file page range.

24. The print control apparatus according to claim 21, wherein the receiving unit receives the plurality of ordered document files in which the print page range is not individually specified in each document file of the plurality of ordered document files.

25. The print control apparatus according to 21, wherein the rasterizing unit is configured to rasterize, as a part of the sequential target pages, based on the print page range, pages from a page corresponding to the print start page to a last page of the one document file and pages from a first page to a page corresponding to the print end page of the another one document file.

26. The print control apparatus according to claim 25, wherein the rasterizing unit is configured to rasterize, as a part of the sequential target pages, based on the print start page and the print end page, all pages of respective document files, of the plurality of ordered document files, that succeed the one document file and precede the other one document file.

27. A print control apparatus comprising:
a printer controller including one or more processors and at least one memory, the printer controller being configured to function as:
a receiving unit configured to receive, from an external device, (i) a plurality of ordered document files, and (ii) two sequential serial page numbers in the plurality of ordered document files for specifying sequential target pages to be printed, one of the two sequential serial page numbers indicating, as an initial page of the sequential target pages, a page of one of the plurality of ordered document files, and the other of the two sequential serial page numbers indicating, as a last page of the sequential target pages, a page of another one of the plurality of ordered document files; and
a rasterizing unit configured to rasterize at least the sequential target pages specified by the two sequential serial page numbers, and not to rasterize one or more pages of one or more document files which do not include the sequential target pages,
wherein the sequential target pages that have been rasterized by the rasterizing unit are printed and the one or more pages of the one or more document files are not printed.

28. The print control apparatus according to claim 27, further comprising a printer engine that prints the sequential target pages that have been rasterized by the rasterizing unit and does not print the one or more pages of the one or more document files.

29. The print control apparatus according to claim 27, wherein, in order to rasterize the sequential target pages and not to rasterize the one or more pages of the one or more document files, the rasterizing unit is configured:
to generate a document file page range for each document file of the plurality of ordered document files based on the two sequential serial page numbers, and
to control, for each document file of the plurality of ordered document files, rasterization of pages of the document file based on the corresponding generated document file page range.

30. The print control apparatus according to claim 27, wherein the receiving unit receives the plurality of ordered document files with which respective print page ranges are not associated.

31. The print control apparatus according to 27, wherein, in the rasterization of the sequential target pages, the rasterizing unit is configured:

not to rasterize one or more pages, which precede the sequential target pages, of the plurality of ordered document files;

to rasterize the sequential target pages specified by the two sequential serial page numbers; and not to rasterize one or more pages, which succeed the sequential target pages, of the plurality of ordered document files.

* * * * *